US009201589B2

(12) United States Patent (10) Patent No.: US 9,201,589 B2
Nasraoui et al. (45) Date of Patent: Dec. 1, 2015

(54) SELECTION AND DISPLAY OF MAP DATA AND LOCATION ATTRIBUTE DATA BY TOUCH INPUT

(71) Applicants: Georges Antoine Nasraoui, Schwerzenbach (CH); Andrew John Burns, Bournemouth (GB)

(72) Inventors: Georges Antoine Nasraoui, Schwerzenbach (CH); Andrew John Burns, Bournemouth (GB)

( * ) Notice: Subject to any disclaimer, the term of this patent is extended or adjusted under 35 U.S.C. 154(b) by 251 days.

(21) Appl. No.: 13/898,865

(22) Filed: May 21, 2013

(65) Prior Publication Data

US 2014/0351732 A1 Nov. 27, 2014

(51) Int. Cl.
*G06F 3/0488* (2013.01)
*G06F 3/0482* (2013.01)
*G06F 3/0481* (2013.01)

(52) U.S. Cl.
CPC ............ *G06F 3/0488* (2013.01); *G06F 3/0482* (2013.01); *G06F 3/04817* (2013.01); *G06F 3/04886* (2013.01)

(58) Field of Classification Search
CPC .............. G06F 2203/04808; G06F 2203/1636; G06F 3/017; G06F 3/0488; G06F 3/04883
See application file for complete search history.

(56) References Cited

U.S. PATENT DOCUMENTS

| 8,375,329 B2 * | 2/2013 | Drayton et al. ............... 715/834 |
| 2004/0181437 A1 | 9/2004 | Colman |
| 2007/0256029 A1 * | 11/2007 | Maxwell ........................ 715/834 |
| 2008/0036732 A1 | 2/2008 | Wilson et al. |
| 2008/0165141 A1 * | 7/2008 | Christie ........................ 345/173 |
| 2009/0061948 A1 | 3/2009 | Lee et al. |
| 2009/0153492 A1 | 6/2009 | Poop |
| 2010/0201636 A1 | 8/2010 | Kikin-Gil |
| 2010/0309140 A1 | 12/2010 | Widgor |
| 2010/0318573 A1 | 12/2010 | Yoshikoshi |
| 2011/0007031 A1 | 1/2011 | Mori |
| 2011/0134047 A1 | 6/2011 | Wigdor et al. |
| 2011/0248928 A1 * | 10/2011 | Michaelraj .................... 345/173 |
| 2012/0154301 A1 | 6/2012 | Kang et al. |
| 2012/0240044 A1 | 9/2012 | Johnson et al. |
| 2013/0300764 A1 * | 11/2013 | Gardenfors et al. .......... 345/629 |
| 2014/0075388 A1 * | 3/2014 | Kuscher et al. ............... 715/834 |

\* cited by examiner

*Primary Examiner* — Nalini Mummalaneni
(74) *Attorney, Agent, or Firm* — Nath, Goldberg & Meyer; Joshua B. Goldberg

(57) ABSTRACT

Embodiments are disclosed that relate to interactions with a touch-sensitive device (10), particularly but not exclusively a device having a touch-sensitive display surface (11). One disclosed embodiment provides a method comprising the steps of: displaying map data (13) on the display surface (11); detecting a first touch input at a first location (201) of the display surface (11); detecting a second touch input at a second location (202) of display surface (11); defining a functional area (203) of the display surface (11) in accordance with the first and second locations (201, 202); graphically representing (204) a plurality of location attribute data filtering functions (16) on a peripheral edge of the functional area (203); detecting a third touch input at a location of the display surface (11) corresponding to a filtering function (16); filtering the location attribute data (14) in accordance with the defined functional area (203) and the selected filtering function (16) to produce a filtered data set; and displaying the filtered data set on the display surface (11).

17 Claims, 11 Drawing Sheets

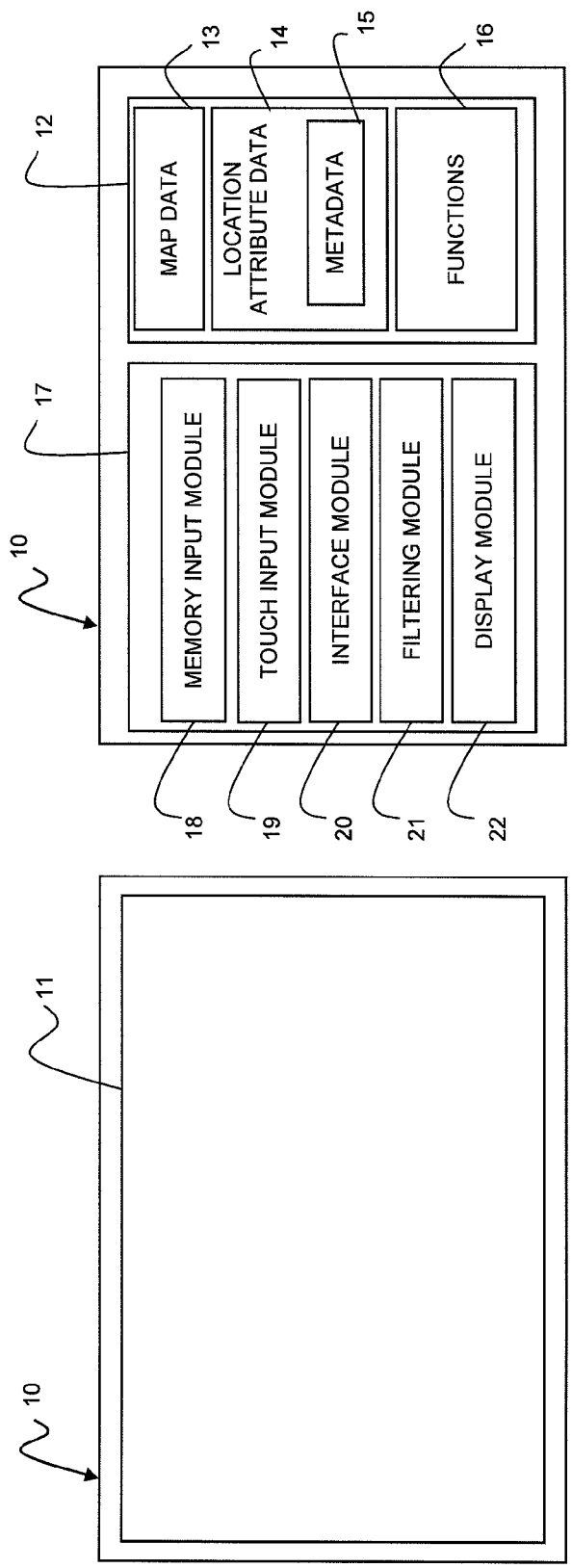

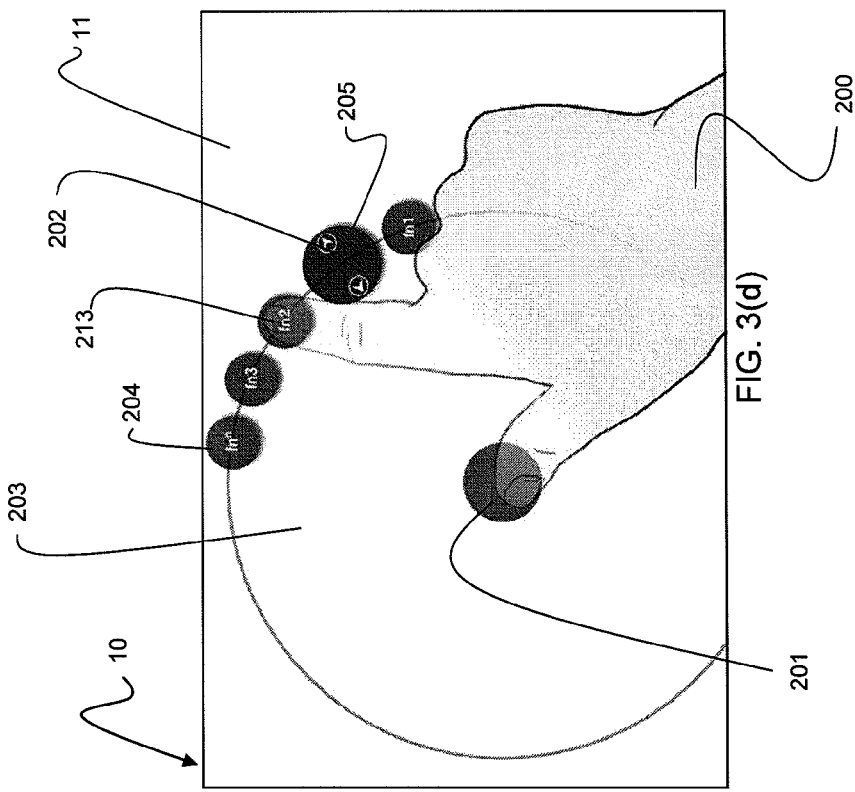
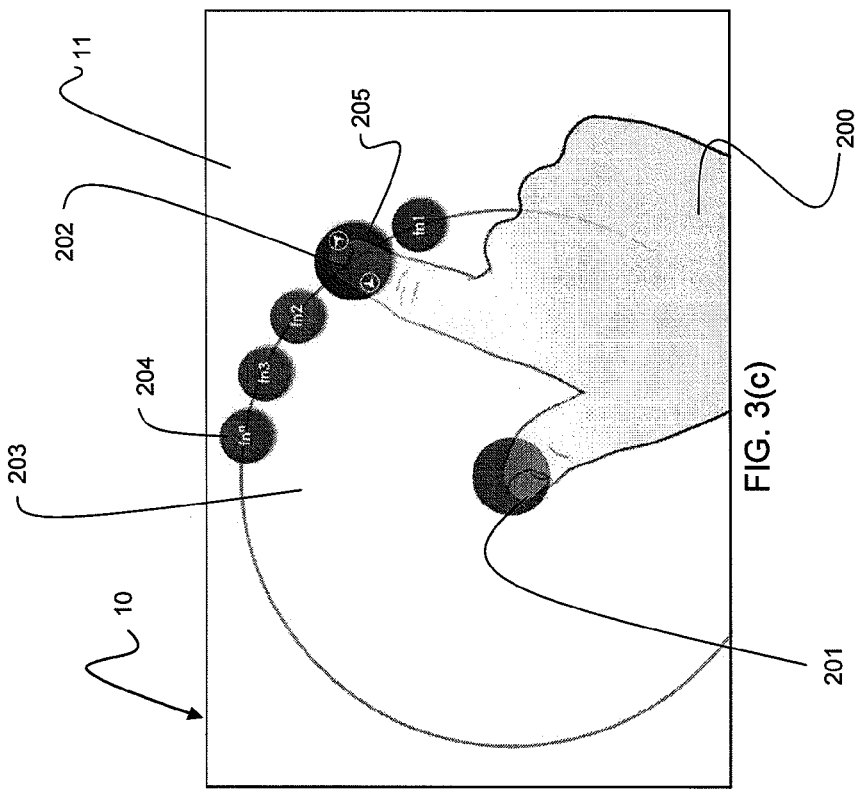

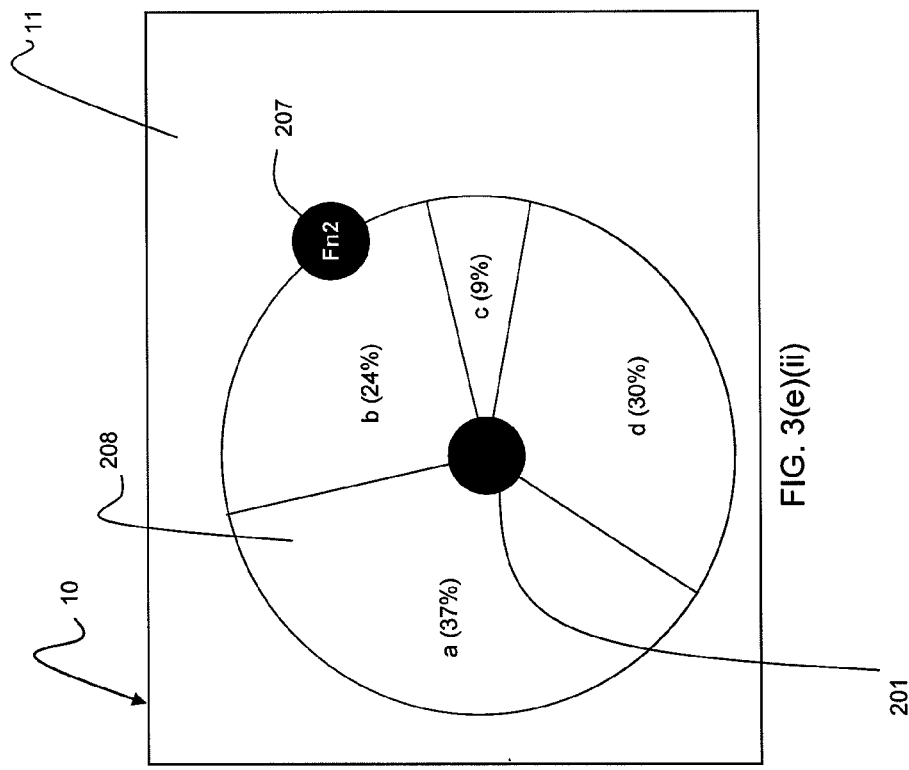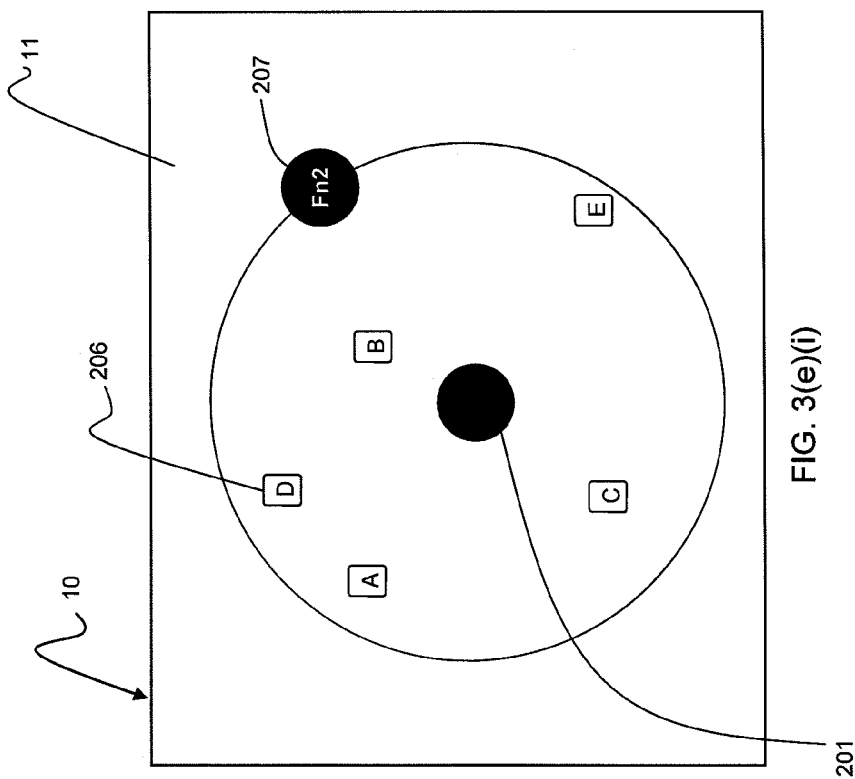

SELECTION AND DISPLAY OF MAP DATA AND LOCATION ATTRIBUTE DATA BY TOUCH INPUT

TECHNICAL FIELD

The disclosed embodiments relate generally to electronic devices with touch input capabilities, and particularly but not exclusively to electronic devices with multi-touch display surfaces.

BACKGROUND

Computing systems having touch input capabilities are now commonplace, for example in the form of mobile telephones and tablet computers. Such devices may be configured to detect input touches from a user, including touch inputs on the display surface by a user's finger, touch inputs on the display surface by a stylus and near-touch inputs directed toward the display surface.

Computing systems having touch input capabilities include touch pad devices and touch screen devices. For the case of touch pad devices, a cursor on a display screen is controlled by the movement of a user's finger or a stylus relative to the touch pad area. For the case of touch screen devices, the display screen is covered by a touch sensitive panel, thereby enabling a user to directly select to Graphical User Interface (GUI) objects on the screen by positioning their finger or a stylus over such objects.

In either case, the touch input capabilities may comprise a so-called tap-to-select input, in which the tap of a user's finger or a stylus on a relevant location on the touch pad or touch screen selects a function displayed on the selected region of the screen. One problem with tap-to-select inputs is the function to be selected must be displayed on the screen of the device in order to enable to user to tap the relevant location on the screen or touch pad. Accordingly, the number of different functions that a user may select is limited by the space available on the screen. This is particularly problematic for the case of smart phones or other portable devices having limited screen sizes.

Based on the above, there is a need for improvements in the way touch inputs are performed on touch sensitive devices.

DEFINITIONS

As used herein, a "map" is defined as a visual representation of an area, which may be a real or imaginary area. Examples of maps include an electron density map, a street map, a stellar map etc.

As used herein, a "geographical map" is defined as visual representation of a portion of the surface of the Earth. Examples of geographical maps include street maps, rail network maps, geological maps, topological maps etc.

As used herein, a "touch input" is defined as any action in which a user makes contact with a touch-sensitive input region such as a touch-sensitive display screen. It will be appreciated that certain input gestures may consist of a single touch input, whereas other input gestures may comprise multiple touch inputs. For the case of input gesture comprising multiple touch inputs, these inputs may be performed sequentially without loss of contact with the touch-sensitive input region. For example, a dragging gesture from location A to location B comprises touch inputs at locations A and B as well as touch inputs at all of the intermediate locations encompassed by the dragging motion.

As used herein, a "touch and hold gesture" is defined as touching a position on a touch-sensitive input region and maintaining contact with said position for a prolonged time period, for example more than one second.

As used herein, a "dragging motion" is defined as a motion in which a fingertip, stylus or the like is moved across a portion of a touch-sensitive input region without losing contact therewith.

SUMMARY

Various embodiments relating to gesture input on a touch-sensitive device are disclosed herein. One disclosed embodiment provides a method of displaying map data and location attribute data on a touch-sensitive display surface, the method comprises the steps of: displaying map data on the display surface; detecting a first touch input at a first location of the display surface; detecting a second touch input at a second location of display surface; defining a functional area of the display surface in accordance with the first and second locations; graphically representing a plurality of location attribute data filtering functions on a peripheral edge of the functional area; detecting a third touch input at a location of the display surface corresponding to a filtering function; filtering the location attribute data in accordance with the defined functional area and the selected filtering function to produce a filtered data set; and displaying the filtered data set on the display surface.

Another embodiment provides a method executable on a device having separate touch input and display components, the method comprising detecting first and second touch inputs at first and second input locations on the touch-sensitive input region and defining first and second display locations in accordance with the respective input locations. The method further comprises defining a functional area in accordance with the first and second display locations. The method also includes graphically representing a plurality of functions on the peripheral edge of the functional area and detecting a third touch input at a location on the touch-sensitive input region corresponding to one of the functions. A further step of the method includes executing the selected function on the defined functional area.

This Summary is provided to introduce a selection of concepts in a simplified form that are further described below in the Detailed Description; it is not intended to identify key features or essential features of the claimed subject matter, nor is it intended to be used to limit the scope of the claimed subject matter. It addition, the claimed subject matter is not limited to implementations that solve any or all disadvantages noted in any part of this disclosure.

BRIEF DESCRIPTION OF THE DRAWINGS

FIG. 1(a) is a schematic illustration of a front face of a computing device in accordance with an aspect of the present invention;

FIG. 1(b) is a schematic illustration of an interior of the computing device illustrated in FIG. 1(a);

FIG. 3(c) shows the touch-sensitive display surface illustrated in FIGS. 3(a) and 3(b) at a later point in time, the figure illustrating a circular functional area defined in accordance with the first and second touch inputs;

FIG. 3(d) shows the touch-sensitive display surface illustrated in FIGS. 3(a) to (c) at a later point in time, the figure illustrating the user providing a third touch input;

FIG. 3(e)(i) shows the touch-sensitive display surface illustrated in FIGS. 3(a) to (d) at a later point in time, the figure illustrating one example graphical representation of a filtered data set on the touch-sensitive display surface;

FIG. 3(e)(ii) shows the touch-sensitive display surface illustrated in FIGS. 3(a) to (d) at a later point in time, the figure illustrating an alternative graphical representation of a filtered data set on the touch-sensitive display surface;

DETAILED DESCRIPTION

Figure 2A:
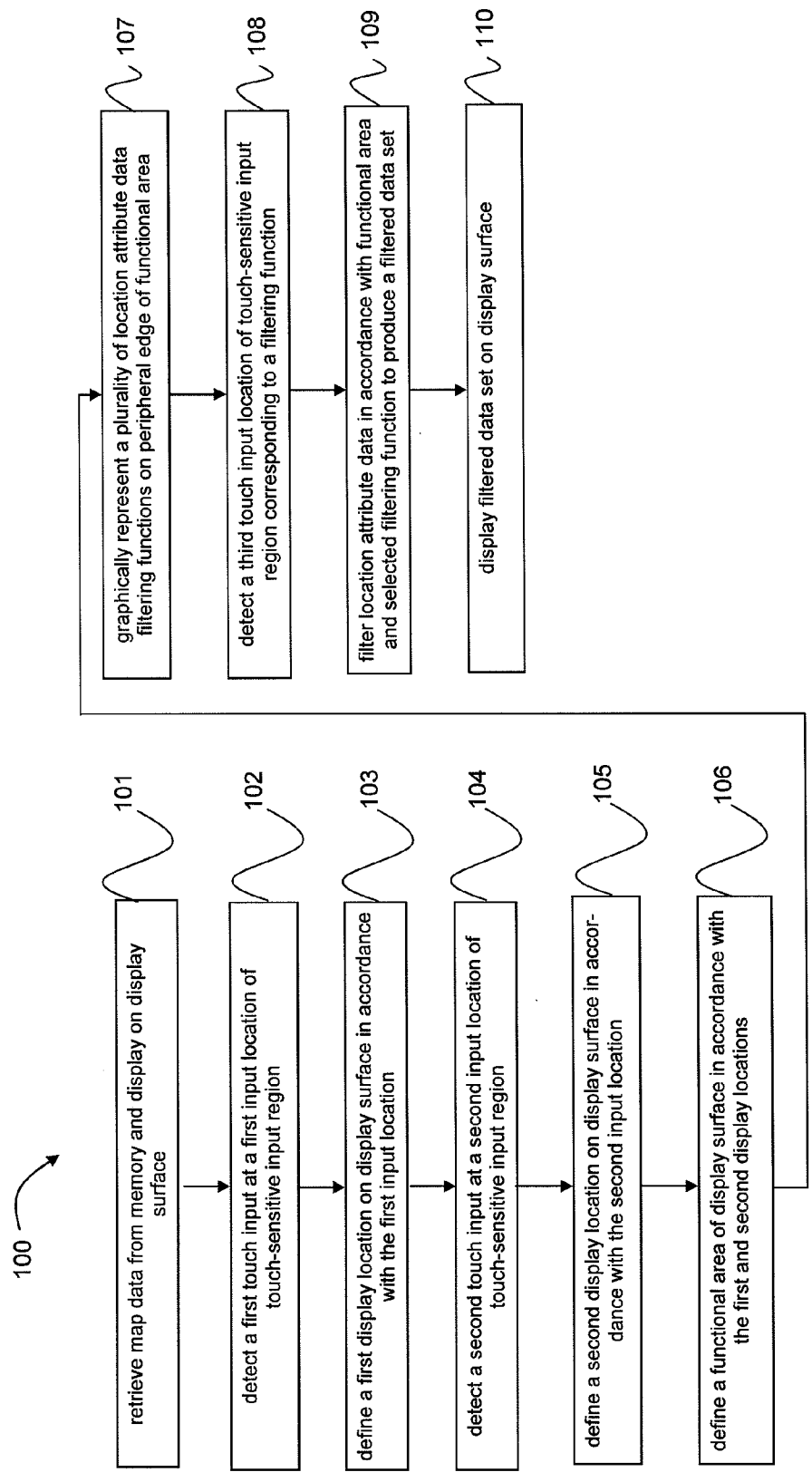
FIG. 2(a) shows a flow diagram illustrating a method of selectively displaying map data and location attribute data based on touch input in accordance with another aspect of the present invention.

Various embodiments of the present invention will now be described by way of example only.

FIG. 1 of the drawings illustrates a computing device 10 in accordance with the present invention. In particular, the computing device 10 is an interactive media display system.

It is envisaged that the present invention will be predominantly applicable to so-called "touch screen" devices having a touch-sensitive display comprising a display screen covered by a touch sensitive panel and hence providing both display and touch input acquisition capabilities. However, the invention is also applicable to so-called "touch pad" devices in which a cursor on a display screen is controlled by the movement of a user's finger or a stylus on a separate touch-sensitive input region. In the illustrated embodiments, the computing device 10 is a touch-screen device comprising a touch-sensitive display surface 11, and in particular a multi-touch display surface 11. The touch-sensitive display surface is configured to display the map data and/or location attribute data and to detect gesture input generated by a user, the gesture input may be simultaneously located at one or more locations on the surface 11.

The computing device 10 further comprises a data store in the form of a memory 12. The memory is configured for storing map data 13, location attribute data 14 and a plurality of location attribute data filtering functions. The functions 16 include location attribute data filtering functions 16 for filtering the location attribute data 14 according to various criteria. The functions 16 may also include non-filtering functions.

In the illustrated embodiments, the map data 13 comprises geographic map data in the form of a street map of London. In other embodiments (not shown), the map data 13 may comprise a stellar map, a map of a surface of a crystal, an anatomical map or the like.

The location attribute data 14 may comprise discrete objects associated with respective discrete locations. Examples of discrete location attribute data include properties for sale, Chinese restaurants or tourist attractions. Alternatively, or in addition thereto, the location attribute data may comprise continuous fields having values at all map locations. Examples of continuous location attribute data include population density, annual rainfall, height above sea level etc. In either case, the location attribute data 14 is associated with the respective map location by means of metadata 15.

The location attribute data filtering functions 16 are user-selectable functions that may be applied to the location attribute data 14 in order to produce a subset of said location attribute data 14. For example, the location attribute data 14 may comprise houses for sale, flats for sale and land for sale and a location attribute data filtering function 16 may be applied in order to produce a subset of location attribute data containing only land for sale.

The computing device 10 further comprises a processor 17. The processor 17 includes a memory input module 18 configured to receive map data 13 and location attribute data 14 from the memory 12. The processor 17 further comprises a touch input module 19 configured to receive input signals from the touch-sensitive display surface 11. An interface module 20 is provided for interpreting the inputs received at the touch input module 19 and commanding a filtering module 21 and/or a display module 22 in accordance with the inputs. For example, if the touch inputs correspond to instructions to define a functional area, the interface module 20 defines said functional area and instructs the display module 22 to display said functional area on the touch-sensitive display surface 11. Alternatively, if the touch inputs correspond to an instruction to filter the location attribute data 14, the interface module commands the filtering module 21 to appropriately filter the location attribute data to produce a filtered data set. The display module 22 is subsequently instructed to display the filtered data set on the touch-sensitive display surface 11.

Figure 2B:
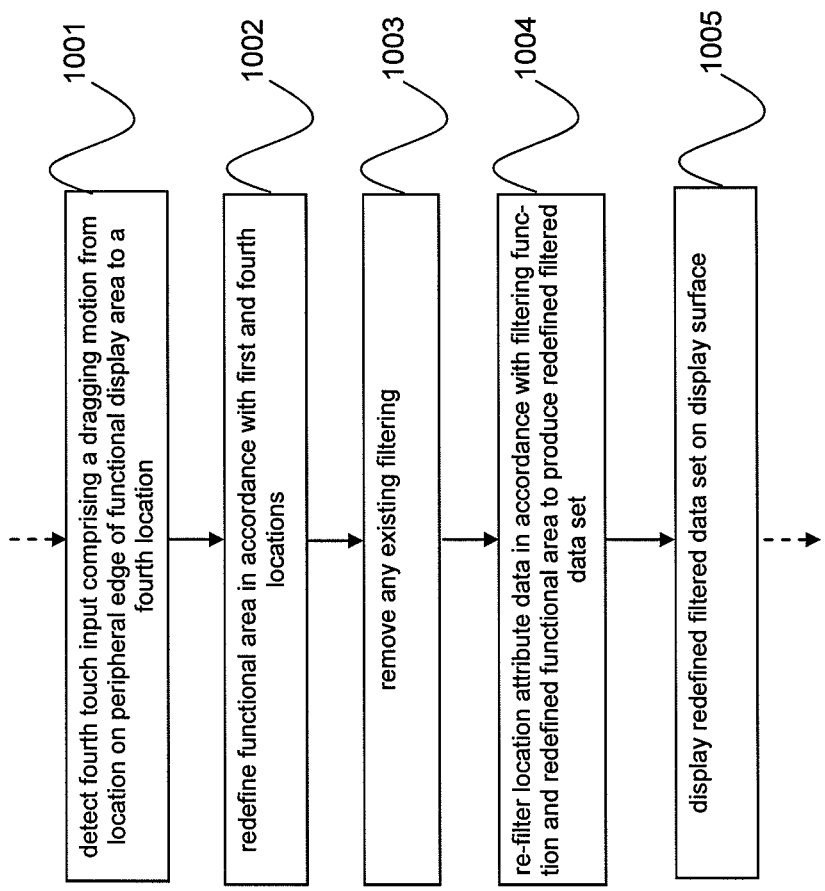
FIG. 2(b) shows a flow diagram illustrating optional additional method steps.

FIG. 2 of the drawings illustrates a method 100 of selectively displaying map data and location attribute data on a display surface in accordance with user input received via the touch-sensitive input region of a computing device.

At step 101, the method 100 comprises displaying map data on the display surface. It is envisaged that the method will be performed on a device 10 such as that illustrated in FIG. 1, namely a device 10 having a touch-sensitive display surface 11. In this embodiment, the touch-display surface is provided by the touch-sensitive display surface 11. Accordingly, step 101 comprises retrieving, via the memory input module 18, the map data 13 from the memory 12. Step 101 further comprises instructing, via the display module 22, the touch-sensitive display surface 11 to display the map data 13.

The method further comprises, at step 102, detecting a first touch input at a first input location of the touch-sensitive input region. If the method 100 is performed on a device 10 having a touch-sensitive display surface 11, the touch-sensitive input region is provided by said touch-sensitive display surface 11. Accordingly, step 102 comprises detecting a first touch input at a first input location 201 of the touch-sensitive display surface 11, said input being provided to the touch input module 19 of the processor 17. In detail, step 102 comprises detecting a single digit tap gesture or a single digit touch and hold gesture at the first input location 201. It is envisaged that the user 200 will perform the first touch input with his or her thumb, as illustrated in FIGS. 3 to 7.

At step 103, the method 100 comprises defining a first display location on the display surface in accordance with the first input location. If the method 100 is performed on a device having a touch-sensitive display surface 11 such as the device 10 illustrated in FIG. 1, the first display location will be identical to the first input location 201 and step 103. It is envisaged that step 103 will be performed by the interface module 20 in accordance with signals received from the touch-input module 19. In an alternative embodiment in which the method 100 is performed on a touch pad device having separate touch-sensitive input regions and display regions, the first input location will be a location on the touch pad, whilst the first display location will be an equivalent location on the display screen.

At a subsequent time, a second touch input is detected at a second input location of the touch-sensitive input region at step 104. If the method 100 is performed on a device 10 having a touch-sensitive display surface 11 such as that illustrated in FIG. 1, the touch-sensitive input region is provided by said touch-sensitive display surface 11. Accordingly, step 104 comprises detecting a second touch input at a second input location 202 of the touch-sensitive display surface 11, said input being provided to the touch input module 19 of the processor 17. In the embodiments illustrated in FIGS. 3 to 7, step 104 comprises detecting a single digit touch and hold gesture at the second input location 201. It is envisaged that the user 200 will perform the second touch input with the forefinger of the hand used to provide the first touch input. Alternatively, the first and second touch inputs may be performed by different hands, for example a forefinger of the left hand may be used to provide the first touch input and a forefinger of the right hand used to provide the second touch input.

Figure 5B:
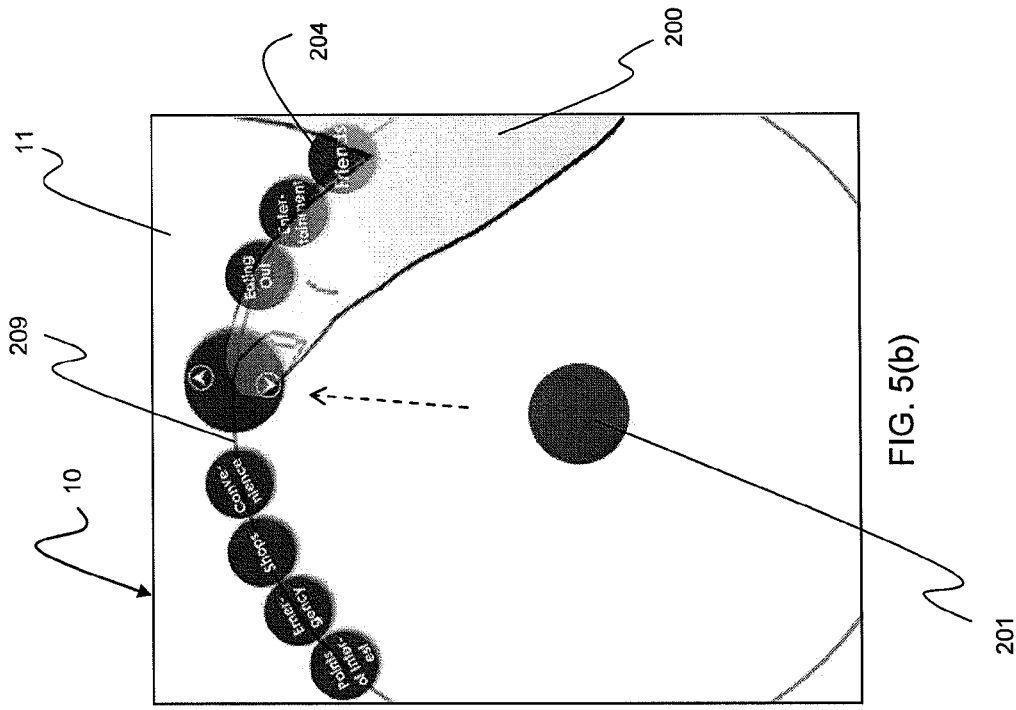
FIG. 5(b) shows the touch-sensitive display surface illustrated in FIG. 5(a) at a later point in time, the figure illustrating the user providing a second touch input.
Figure 5A:
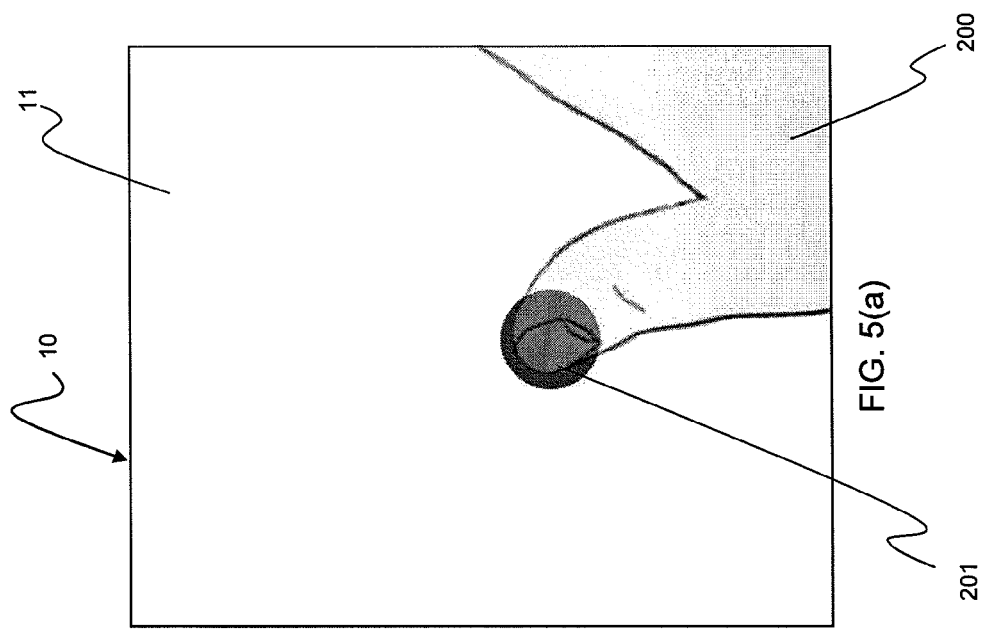
FIG. 5(a) shows a representation of a touch-sensitive display surface of the computing device illustrated in FIG. 1, the figure illustrating a user providing a first touch input.

In an alternative embodiment, the step of detecting the second touch input comprises detecting a dragging motion terminating at the second input location 202, said dragging motion being in a direction radially outwardly from the first input location 201. In this embodiment, the user 200 may perform a reverse-pinch gesture in which one of the digits performing the pinch remains stationary throughout the reverse-pinch gesture, the position of the stationary digit defining the first input location 201 and the final position of the moving digit defining the second input location 202. Alternatively, as illustrated in FIG. 5, the user 200 may initially provide the first touch input and subsequently provide the second touch input. In particular, the user 200 may provide a touch and hold gesture in order to define the first input location 201. Without removing the digit providing the first touch input from the touch-sensitive display surface 11, the user 200 may then drag this digit from the first input location 201 to the second input location 202. The user 200 may signify the end of this dragging motion by holding the digit at the second input location 202 for a prolonged period, for example at least one second. In this embodiment, a plurality of virtual buttons 204 may be displayed on the circumference of a circle 209 centred on the first input location 201, the circumference intersecting the location of the digit on the touch-sensitive display surface 11. The virtual buttons 204 represent respective location attribute data filtering functions. Movement of the digit in contact with the touch-sensitive input region in a radial direction causes enlargement or contraction of the circle 209, whilst movement of the digit in a circumferential direction enables the user 200 to select one of the virtual buttons 204 and hence select a location attribute data filtering function. It will be appreciated that the embodiment illustrated in FIG. 5, in which the second touch input comprises detecting a dragging motion and the user provides the first and second touch inputs sequentially, enables the user 200 to define a function area 203 having dimensions greater than the dimensions of the display surface 11. Accordingly, this embodiment is particularly applicable to small screen devices such as touch-screen cell phones.

At step 105, the method 100 comprises defining a second display location on the display surface in accordance with the second input location. In embodiments in which the method 100 is performed on a device 10 having a touch-sensitive display surface 11 such as that illustrated in FIG. 1, the second display location will be identical to the second input location 202. It is envisaged that step 105 will be performed by the interface module 20 in accordance with signals received from the touch-input module 19. In an alternative embodiment in which the method 100 is performed on a touch pad device having a display surface and a separate touch-sensitive input region in the form of a touch-pad, the first second location will be a location on the touch pad, whilst the second display location will be an equivalent location on the display screen.

The method 100 continues at step 106 with the step of defining a functional area 203 of the display surface in accordance with the first and second display locations, this step being performed by the interface module 20. The functional area 203 will encompass only a portion of the display surface i.e. not the entirety of the display surface. In this way, the peripheral edge of the functional area 203 is contained within the display surface.

It is envisaged that the shape of the functional area 203 will be preselected prior to the user 200 providing the first touch input. This pre-selection of the shape of the functional area 203 may be fixed or may be controllable by the user 200, for example through a setting menu.

In the embodiments illustrated in FIGS. 3 and 5 to 7, the functional area is circular and is defined such that the first input location 201 is located within an interior of the functional area 203 and the second input location 202 is located on a peripheral edge of the functional area. In particular, the first input location 201 defines a centre-point of the functional area 203 and the second input location 202 is located on the circumference of the functional area 203. In an alternative embodiment illustrated in FIG. 4, the functional area is rectangular. In this embodiment, the first input location 201 defines the lower left-hand corner of the functional area 203 and the second input location 202 defines the upper right-hand corner of the functional area 203.

At step 107, the method 100 comprises retrieving, via the memory input module 18, at least a portion of the functions 16 from the memory 12. Step 107 further comprises graphically representing at least a portion of the functions 16 on the peripheral edge of functional area 203, which may be effected by the interface module 21 and/or the display module 22. In detail, the step of graphically representing the functions 16 comprises displaying a plurality of virtual buttons 204 on the peripheral edge of the functional area 203, each of the virtual buttons 204 corresponding to a respective function 16. The functions 16 may be location attribute data filtering functions and/or non-filtering functions.

It will be appreciated that one advantage of the present invention is that the functions 16 are made easily accessible to the user 200 at the time at which the user 200 would wish to select a function i.e. after the area to which the function is to be applied, namely the functional area 203, has been defined.

At step 108, the method 100 comprises detecting a third touch input at a third input location of touch-sensitive input region, the third input location corresponding to one of the virtual buttons 204 representing the functions 16. If the method 100 is performed on a device 10 having a touch-sensitive display surface 11, the touch-sensitive input region is provided by said touch-sensitive display surface 11. Accordingly, step 108 comprises detecting a third touch input at a location of a virtual buttons 204 representing a function 16.

Figure 3B:
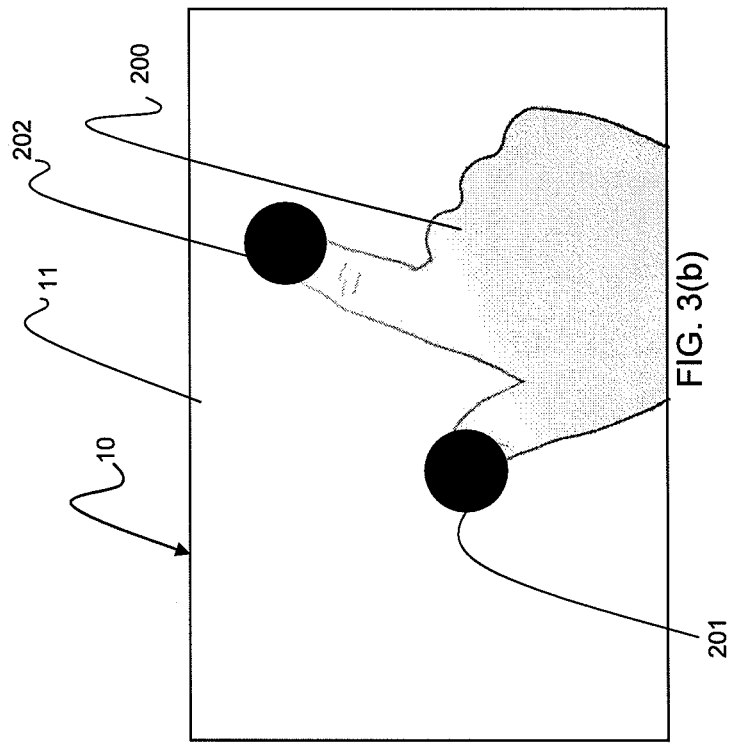
FIG. 3(b) shows the touch-sensitive display surface illustrated in FIG. 3(a) at a later point in time, the figure illustrating the user providing a second touch input.

FIGS. 3(c) and 3(d) show an embodiment in which four virtual buttons 204, distributed either side of the second input location 202 are displayed at step 107. The second input location 202 itself defines the location of an additional virtual button 205 for adjusting the size of the functional area 203 and/or re-displaying the plurality of virtual buttons 204 if these buttons 204 have been removed from the display surface 11 though subsequent user interaction with the computing device 10. In the embodiment illustrated in FIG. 3, step 108 comprises detecting a dragging motion from the second input location 202 to the virtual button 204 representing the "fn 2" filtering function. In this embodiment, the user 200 maintains the first touch input at the first input location 201, whilst providing the dragging gesture of the third touch input. It is envisaged that the user 200 will provide the first touch input with his or her thumb and the third touch input with the forefinger of the same hand, thereby performing a gesture in which the hand is rotated about the thumb.

An alternative embodiment is illustrated in FIG. 7. Similarly to the embodiment illustrated in FIG. 3, the user 200 maintains the first touch input at the first input location 201, whilst providing the dragging gesture of the third touch input. However, in this embodiment the virtual buttons 204 representing the location attribute data filtering functions are not immediately displayed upon defining the functional area 203 and thus step 108 comprises detecting a dragging motion from the virtual button 211 representing the sport subset of filtering functions as opposed to a dragging motion from the second input location 202. In the illustrated embodiment, the dragging motion is terminated at the virtual button 204 representing the "timetable" filtering function.

One advantage of the above-described embodiments is that the user 200 may select a map region of interest, namely the functional area 203, and subsequently select the filtering function 16 to be applied to that area 203 in one hand movement. This single hand movement may comprise touching a thumb to the first input location 201, touching a finger to the second input location 202 and subsequently rotating the hand about the thumb to drag the finger from the second input location 202 to the third input location.

Figure 6B:
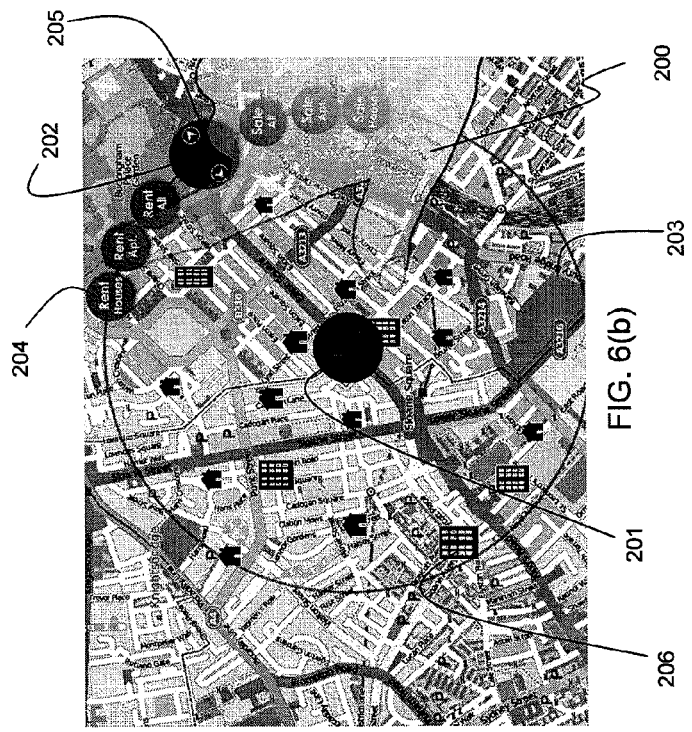
FIG. 6(b) shows the touch-sensitive display surface illustrated in FIG. 6(a) at a later point in time, the figure illustrating the user selecting a filtering function via a third touch input.
Figure 6A:
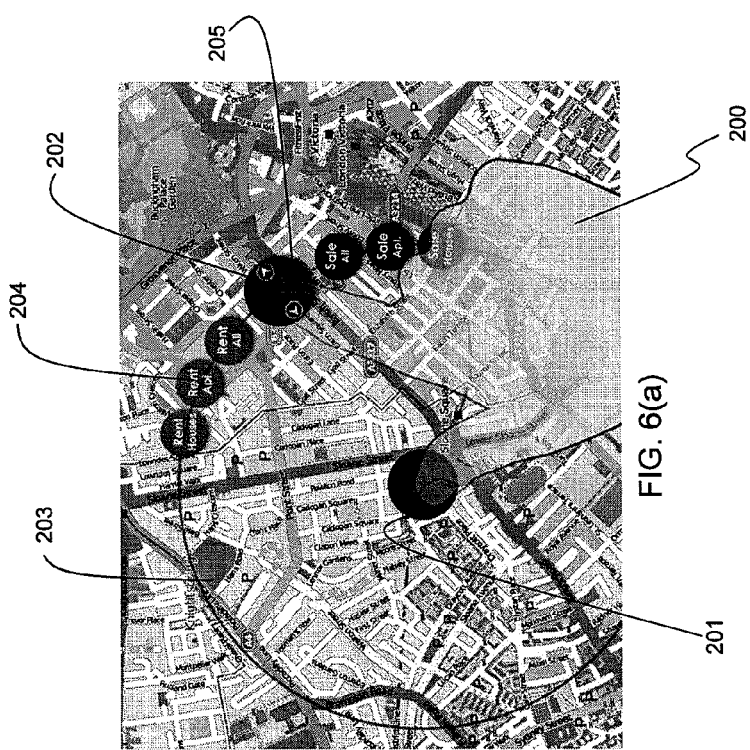
FIG. 6(a) shows a representation of a touch-sensitive display surface of the computing device illustrated in FIG. 1, the figure illustrating map data displayed on the touch-sensitive display surface and a circular functional area defined on the display surface, a plurality of virtual buttons representing respective filtering functions being displayed on the circumference of the functional area.

An alternative embodiment is illustrated in FIG. 6, step 108 comprises detecting a tap gesture or a touch and hold gesture at the virtual button 204 representing the "rent apt." filtering function. In this embodiment, it is not necessary for the user to maintain the first touch input at the first input location 201 whilst providing the third touch input. Accordingly, the user may touch a finger to the first input location 201, touch the same finger to the second input location 202, and subsequently drag the finger from the second input location 202 to the third input location.

In certain embodiments, step 107 comprises displaying only functions 16 that are relevant to the selected functional area 203. In particular, step 107 comprises displaying only those location attribute data filtering functions that will produce, for the selected functional area 203, a filtered data set having at least one entry. It will be appreciated that the absence of a virtual button associated with a given location attribute data filtering function 16 provides an immediate indication to the user 200 that the selected functional area 203 does not yield any results for this filtering function 16. The user 200 may then wish to re-define the functional area 203 in order to obtain a non-zero filtered data set. Furthermore, the feature of displaying only the functions 16 that are relevant to the selected functional area 203 ensures that the display screen is 11 is not cluttered and thus the map data 13 displayed on the screen 11 is not significantly obscured.

Figure 7B:
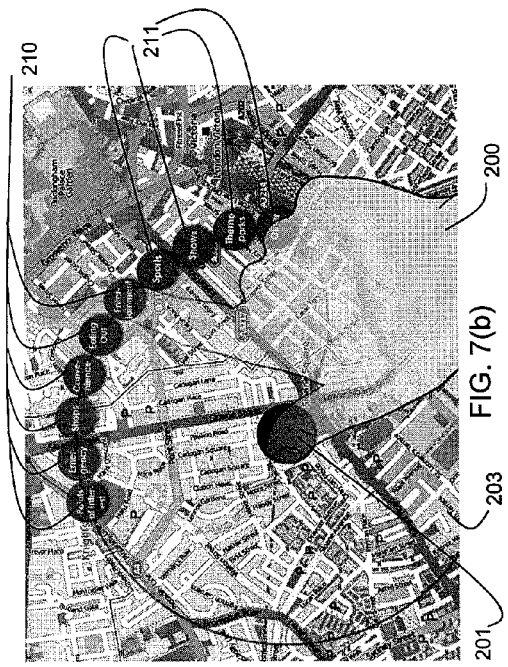
FIG. 7(b) shows the touch-sensitive display surface illustrated in FIG. 7(a) at a point in time immediately after the user has selected a subset of filtering functions, the figure illustrating a plurality of virtual buttons representing respective narrower subsets of filtering functions displayed on the circumference of the functional area.
Figure 7D:
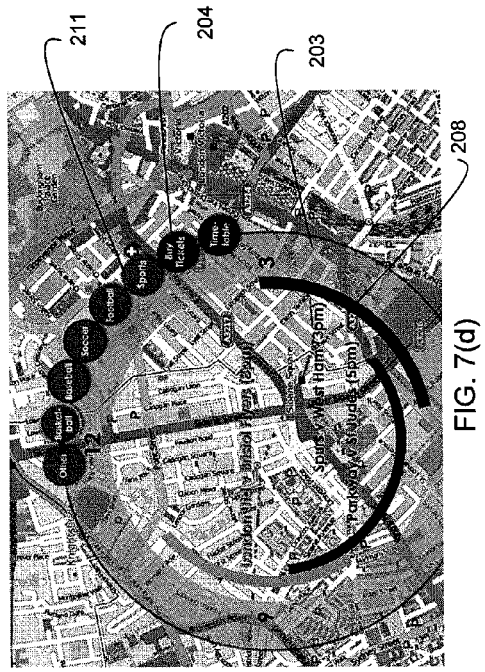
FIG. 7(a) shows a representation of a touch-sensitive display surface of the computing device illustrated in FIG. 1, the figure illustrating map data displayed on the touch-sensitive display surface and a circular functional area defined on the display surface, a plurality of virtual buttons representing respective subsets of filtering functions being displayed on the circumference of the functional area.
FIG. 7(c) shows the touch-sensitive display surface illustrated in FIGS. 7(a) and 7(b) at a point in time immediately after the user has selected a narrower subset of filtering functions, the figure illustrating a plurality of virtual buttons representing respective filtering functions being displayed on the circumference of the functional area; and, FIG. 7(d) shows the touch-sensitive display surface illustrated in FIGS. 7(a) to (c) at a point in time, the figure illustrating a graphical representation of a filtered data set on the touch-sensitive display surface.
Figure 7A:
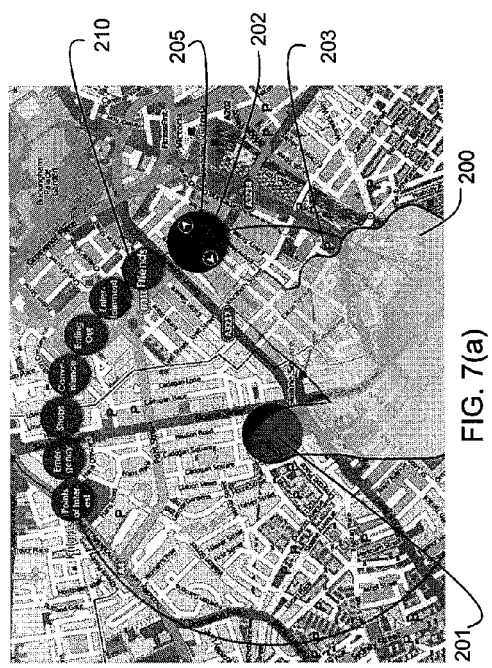
Figure 7C:
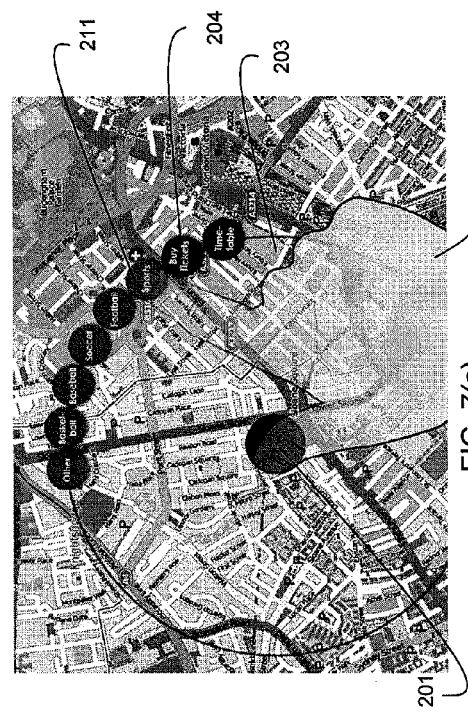

In certain embodiments, particularly embodiments having a large number of functions 16, the functions 16 may be arranged in subsets. In such embodiments, step 107 may be preceded by the step of graphically representing a plurality of subsets of functions 16 on the peripheral edge of the functional area 203. A user may select one of these subsets, which will then be expanded to display the constituent functions 16. The step of graphically representing the subsets may comprise displaying a plurality of virtual buttons 210, 211 on the peripheral edge of the functional area 203, each of the virtual buttons 210, 211 corresponding to respective subsets of location attribute data filtering functions. FIG. 7 illustrates an example of an interface executed on a touch-sensitive display surface 11 in which virtual buttons 210 representing a first level of subsets of functions 16 are initially displayed on the peripheral edge of the functional area 203. In this example, the first level of subsets comprises: points of interest; emergency; shops; convenience; eating out; entertainment; and friends. As illustrated in FIG. 7(b), the user 200 selects the subset of entertainment by pivoting his or her hand such that his or her thumb maintains contact with the touch-sensitive display surface 11 at the first input location 201 whilst his or her index finger is dragged across the display surface 11 from the second input location 202 to the location of the virtual button 210 representing the entertainment subset. Once the user 200 has selected the entertainment subset, virtual buttons 210 representing the first level of subsets to the right of the entertainment subset button 210 are replaced by virtual buttons 211 representing a second level of subsets of location attribute data filtering functions. The second level of subsets provides different categories of data filtering function relating to entertainment: sports; shows, theme parks; and other. It is envisaged that virtual buttons 210, 211 belonging to different levels of subsets will be distinguished from one another by colour, size or other appropriate means. As illustrated in FIG. 7(c), the user 200 selects the subset of sports by pivoting his or her hand such that his or her thumb maintains contact with the touch-sensitive display surface 11 at the first location 201 whilst his or her index finger is dragged across the display surface 11 from the virtual button 210 representing the entertainment subset to the virtual button 211 representing the sport subset. Once the user 200 has selected the sport subset, virtual buttons 211 representing the second level of subsets are replaced by virtual buttons 204 representing the location attribute data filtering functions within the sport subset. These filtering functions are of two different types: those filtering in accordance with the sport (football; soccer; baseball; basketball; other) and those filtering in accordance with aspects of sport (timetable; buy tickets).

In certain embodiments, the functions 16 may be arranged in hierarchical structure such that only certain functions are initially displayed upon the user defining the functional area 203 via the first and second touch inputs. Upon selection, via the third touch input, of one of the initially displayed functions additional functions are displayed on the peripheral edge of the functional area 203. These functions may replace all of the initially displayed functions or may replace all of the initially displayed functions with the exception of the selected function or may be displayed in addition to the initially displayed functions. It is envisaged that the highest level of the hierarchical structure will comprise location attribute data filtering functions. The lower levels of the hierarchical structure may comprise additional location attribute data filtering functions and/or non-filtering functions. In one embodiment of the invention (not shown), a virtual button (not shown) may represent a broad location attribute data filtering function and simultaneously represent a subset of finer location attribute data filtering functions and/or non-filtering functions. For example, the broad filtering function may, when executed, filter the location attribute data 14 such that houses for sale within the selected functional area 203 are displayed. In this example, the fine filtering functions may comprise: detached houses; semi-detached houses; and terraced houses. This structure may continue through additional hierarchical levels, each level providing increasingly fine filtering. It is envisaged that non-filtering functions may also be provided, either alongside filtering functions or at the bottom of the hierarchical structure i.e. the non-filtering functions are displayed when no further filtering is available. In the above-described example relating to houses for sale, the non-filtering functions may include a command to email details of all of the houses within the filtered data set to a given email address. It will be appreciated that the present invention may comprise any number of levels within the hierarchical structure in which the functions 16 are arranged.

It will be appreciated that in all of the above-described embodiments of the present invention, the output displayed on the touch sensitive display surface 11 dynamically responds to the movement of the user 200 such that the user 200 is presented with all of the required functionality in a way that does not substantially obscure the view of the map data 13 on the touch sensitive display surface 11 and in a way that allows the user to select the desired functionality through simple hand gestures. It will be appreciated that this interaction with the device 10 is both quick and intuitive.

Furthermore, the user 200 may provide inputs using a single hand only, thereby leaving the other hand free to hold the device 10.

The method further comprises, at step 109, filtering the location attribute data 14, this step being performed by the filtering module 21 of the processor 17.

It will be appreciated that the location attribute data 14 is associated with map locations via the metadata 15 component of the former. This association enables filtering of the location attribute data 14 such that only location attribute data 14 in the area of interest is displayed to the user 200. It will be appreciated that the user 200 identifies this area of interest by defining the functional area 203 through the first and second touch inputs. Accordingly, step 109 comprises filtering in accordance with the functional area 203. In detail, step 109 comprises identifying a subset of map data 13 encompassed by the functional area 203 and, via the metadata component 15 of the location attribute data 14, identifying a subset of location attribute data 14 associated with said subset of map data 13.

Step 109 further comprises filtering the location attribute data 14 in accordance with the location attribute data filtering function 16 selected via the third touch input. It is envisaged that the location attribute data 14 will comprise a number of different fields, for example land height, annual rainfall, house prices etc. When applied to the location attribute data 14, each of the filtering functions 16 select a limited number of these fields. In a preferred embodiment, each of the filtering functions 16 selects only one field.

The location attribute data 14 that is selected via filtering in accordance with functional area 203 and selected via filtering in accordance with the location attribute data filtering function 16 selected via the third touch input forms a filtered data set.

Considering the example illustrated in FIG. 6, the user 200 provides first and second touch inputs as described above to define the circular function area 203 illustrated in the figure. The user 200 then selects the "rent apt." filtering function via the third touch input at step 108. Accordingly, step 109 of the method 100 comprises filtering in accordance with the defined functional area 203, such that the filtered data set comprises only location attribute data 14 relating to the portion of the map encompassed by the functional area 203. Step 109 further comprises selecting only entries in the location attribute data 14 relating to apartments for rent i.e. only entries having non-zero values in the fields relating to apartments for rent. The resulting filtered data set thus contains only location attribute data 14 relating to apartments for rent within the geographical region encompassed by the functional area 203.

An alternative example is illustrated in FIG. 7. In this example, the user 200 provides first and second touch inputs as described above to define the circular function area 203 illustrated in the figure. The user 200 then selects the "timetable" filtering function via the third touch input at step 108, which belongs to the subset of "sports" filtering functions and the wider subset of "entertainment" filtering functions. Accordingly, step 109 comprises filtering in accordance with the defined functional area 203 as described above. Step 109 further comprises selecting only entries in the location attribute data 14 relating to the times of sporting events scheduled for the day. The resulting filtered data set thus contains only location attribute data relating to times of sporting events scheduled for the day and occurring within the locations encompassed by the functional area 203.

At step 110, the method comprises displaying the filtered data set on the display surface. If the method 100 is performed on a device 10 having a touch-sensitive display surface 11 such as that illustrated in FIG. 1, step 110 comprises displaying the filtered data set of the touch-sensitive display surface 11. It is envisaged that the filtering module 21 of the processor 17 will provide the filtered data set to the display module 22, which will instruct the touch-sensitive display surface 11 to display an appropriate graphical representation of the data set. As discussed above, the location attribute data 14 may comprise discrete objects associated with respective discrete locations. Alternatively, or in addition thereto, the location attribute data may comprise continuous fields having values at all map locations.

Figure 3A:
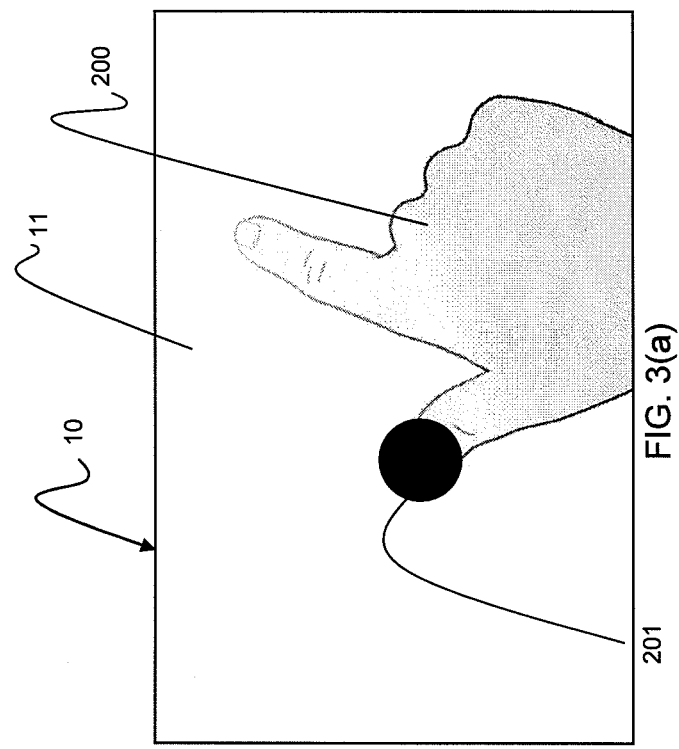
FIG. 3(a) shows a representation of a touch-sensitive display surface of the computing device illustrated in FIG. 1, the figure illustrating a user providing a first touch input.
Figure 4A:
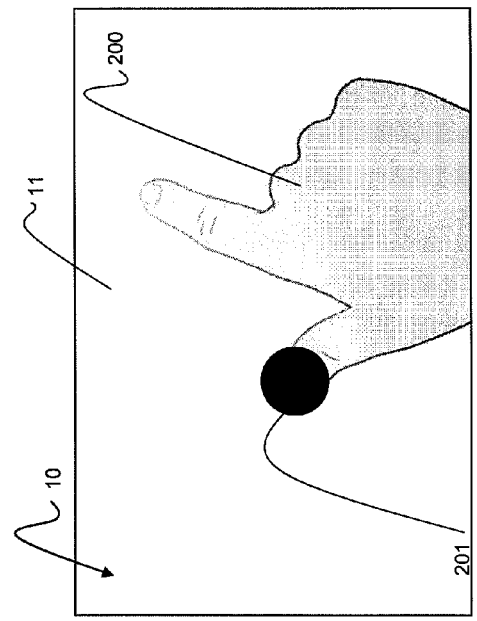
FIG. 4(a) shows a representation of a touch-sensitive display surface of the computing device illustrated in FIG. 1, the figure illustrating a user providing a first touch input.
Figure 4B:
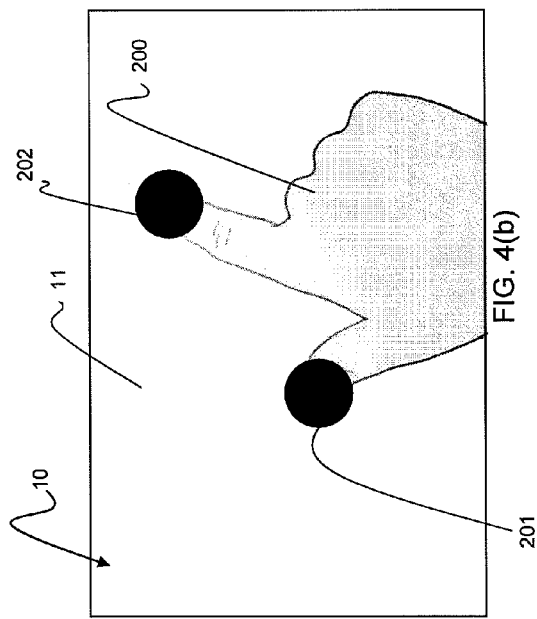
FIG. 4(b) shows the touch-sensitive display surface illustrated in FIG. 4(a) at a later point in time, the figure illustrating the user providing a second touch input.
Figure 4C:
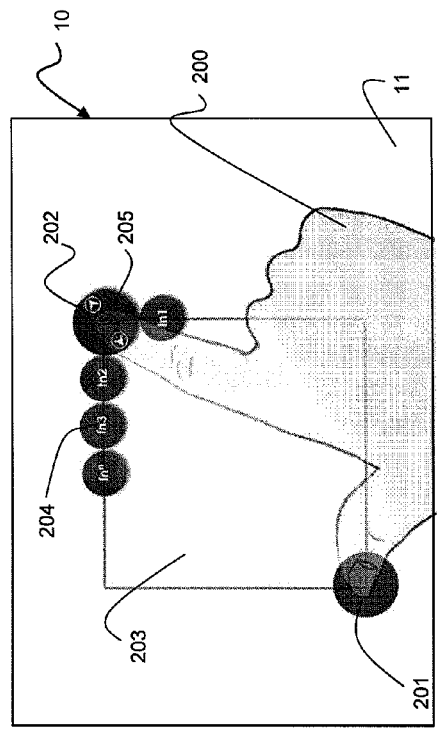
FIG. 4(c) shows the touch-sensitive display surface illustrated in FIGS. 4(a) and 4(b) at a later point in time, the figure illustrating a square functional area defined in accordance with the first and second touch inputs.

It is envisaged that if the user 200 selects a filtering function 16 relating to a discrete field of location attribute data 14, step 110 comprises displaying icons 206 representative of each of the discrete objects at respective map locations associated with said objects. A generic example is illustrated in FIG. 3(*e*)(*i*) and a more specific example is illustrated in FIG. 6. In the example illustrated in FIG. 6, the user 200 selects the "rent apt." filtering function and thus the filtered data set consists of apartments for rent, which are discrete objects. Accordingly, at step 110, icons 206 representative of each of the apartments for rent are displayed within the functional area 203, as illustrated in FIG. 6(*b*).

Alternatively, if the user 200 selects a filtering function 16 relating to a continuous field of location attribute data 14, step 110 comprises displaying a graphical representation, such as a graph or chart 207, of the values of said continuous field for the defined functional area 203. A generic example of a graph in the form of a pie chart is illustrated in FIG. 3(*e*)(*ii*). This pie chart could, for example, illustrate popular modes of transport, population breakdown by age etc. In any case, the graph or chart is made up of the combined entries within the filtered data set i.e. all values of the continuous field evaluated within the functional area 203.

In an alternative example illustrated in FIG. 7(*d*), the user 200 selects the "timetable" filtering function. In this example, the filtered data set consists of three entries, relating to respective sports fixtures. Each of the entries includes a location, the teams involved, a start time and an end time. This information is displayed in the form of a clock-type chart 208, with three circumferential bands of different colours indicating the times of the various fixtures, each band being labelled with the teams involved and the start time.

In an alternative embodiment (not shown), a virtual button may simultaneously represent a broad location attribute data filtering function and a subset of finer location attribute data filtering functions. Selection of a virtual button of this type causes the broad location attribute data filtering function to be executed and the filtered data set displayed within the function area 203. Simultaneously, additional virtual buttons representing the finer location attribute data filtering functions within the subset are displayed on the peripheral edge of the functional area 203. The user 200 may optionally select one of the virtual buttons representing the finer location attribute data filtering functions by sliding his or her finger along the peripheral edge of the functional area 203 to the virtual button. For example, a virtual button representing "houses for sale" may initially be displayed the peripheral edge of the functional area 203. The user 200 may select this virtual button by dragging his or her finger to the location of the virtual button. Upon selection of this virtual button, the location attribute data 14 is filtered and the filtered data set, containing houses for sale within the selected function area 203, is displayed on the touch-sensitive display surface. Simultaneously, virtual buttons representing filtering functions in accordance with different sub-categories within the "houses for sale" category are displayed on the peripheral edge of the functional area 203. For example, virtual buttons representing "detached houses", "semi-detached houses" and "terraced houses" may be displayed. The user 200 may then select one of these virtual buttons, the effect of which is to modify the output of the touch-sensitive display screen 11 such that only the houses for sale within the functional area 203 and belonging to the selected category are displayed.

As discussed above, in preferred embodiments, only certain location attribute data filtering functions are displayed at step 107. In particular, only those certain location attribute data filtering functions that will produce, for the selected functional area 203, a filtered data set having at least one entry are displayed. Accordingly, in these embodiments, the filtered data set displayed at step 110 is never empty. Advantageously, this prevents the user 200 from wasting time in selecting location attribute data filtering functions that will not provide a meaningful output.

FIGS. 2(*b*) and 2(*c*) show possible additional steps of the method 100.

The additional steps shown in FIG. 2(*b*) relate to the re-sizing of the functional area 203, whilst the additional steps shown in FIG. 2(*c*) relating to the translation of the functional area 203.

With reference to FIG. 2(*b*), step 1001 comprises detecting a fourth touch input on the touch-sensitive input region, the fourth touch input comprising a dragging motion from location corresponding to a peripheral edge of functional area to a fourth location on the touch-sensitive input region. In embodiments in which the method 100 is performed on a device 10 having a touch-sensitive display surface 11, step 1001 comprises detecting a fourth touch input on the touch-sensitive display surface 11, the fourth touch input comprising a dragging motion from the peripheral edge of functional area 203 to a fourth location of the touch-sensitive display surface 11, which may or may not be within the functional area 203. It is envisaged that the dragging motion of the fourth touch input will originate at the additional virtual button 205 and the display provided on the touch-sensitive display surface 11 will adjust in real-time such that the additional virtual button 205 is translated across the touch-sensitive display surface 11 in accordance with the dragging motion.

Step 1002 of the method 100 comprises redefining the functional area 203 in accordance with first and fourth input locations such that the first input location 201 is located within an interior of the redefined functional area and the fourth location is located on a peripheral edge of the redefined functional area. In this way, the fourth input location essentially replaces the role of the second input location 202 in defining the functional area.

At step 1003 the method 100 comprises removing any existing filtering. At step 1004 the method 100 comprises re-filtering the location attribute data 14 in accordance with the re-defined functional area and in accordance with the location attribute data filtering function 16 selected via the third touch input to produce a redefined filtered data set. This redefined filtered data set is displayed on the touch-sensitive display surface 11 at step 1005.

Steps 1004 and 1005 are only carried out if the location attribute data filtering function 16 selected via the third touch input will produce, for the re-defined functional area, a filtered data set having at least one entry. If this is not the case, the user 200 may be given the option to select a different location attribute data filtering function 16 using, for example, the method described in relation to steps 107 and 108.

It is envisaged that steps 1001 to 1005 will be performed after step 110. However, it is within the scope of the present invention to redefine the functional area 203 prior to selection of a location attribute data filtering function 16. Accordingly, steps 1001 and 1002 may be performed at any point between steps 107 and steps 110.

Figure 2C:
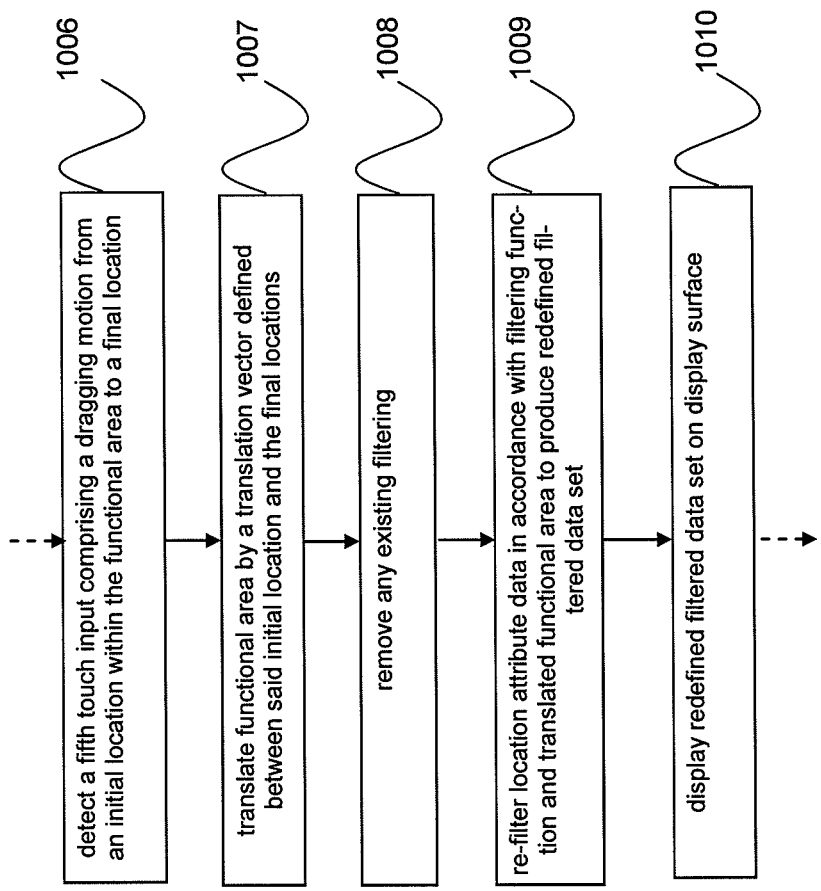
FIG. 2(c) shows a flow diagram illustrating alternative optional additional method steps.

With reference to FIG. 2(c), additional step 1006 of the method 100 comprises detecting a fifth touch input on the touch-sensitive input region, the fifth touch input comprising a dragging motion from an initial location within an interior of functional area to a final location on the touch-sensitive input region. In embodiments in which the method 100 is performed on a device 10 having a touch-sensitive display surface 11, step 1006 comprises detecting a fifth touch input on the touch-sensitive display surface 11, the fifth touch input comprising a dragging motion from an initial location within the functional area 203 to a final location of the touch-sensitive display surface 11, which may or may not be within the functional area 203. In embodiments in which the functional area is circular, such as those illustrated in FIGS. 3 and 5 to 7, it is envisaged that the initial location will be the centre-point of the circular functional area i.e. the first input location 201.

Step 1007 of the method 100 comprises translating the functional area 203 by a translation vector defined between the initial location and final locations of the fifth touch input. It is envisaged that the translation will be in real-time i.e. the position of the functional area 203 on the display screen 11 will continuously updated as the user drags his or her finger across the screen 11.

At steps 1008 and 1009, the method 100 comprises removing any existing filtering in accordance with functional area and re-filtering the location attribute data 14 in accordance with the re-defined functional area, and in accordance with the location attribute data filtering function 16 selected via the third touch input, to produce a redefined filtered data set. This redefined filtered data set is displayed on the touch-sensitive display surface 11 at step 1010.

Steps 1009 and 1010 are only carried out if the location attribute data filtering function 16 selected via the third touch input will produce, for the re-defined functional area, a filtered data set having at least one entry. If this is not the case, the user 200 may be given the option to select a different location attribute data filtering function 16 using, for example, the method described in relation to steps 107 and 108.

In certain embodiments, steps 1006 to 1010 will only be performed if a time period in which no contact with the touch-sensitive input region is detected prior to detecting the fifth touch input at step 1006.

It is envisaged that steps 1001 to 1005 will be performed after step 110. However, it is within the scope of the present invention to redefine the functional area 203 prior to selection of a location attribute data filtering function 16. Accordingly, steps 1006 and 1007 may be performed at any point between steps 107 and steps 110.

Whilst the above-described embodiments have been described in relation to the use of digits to perform the touch inputs, it will be appreciated that the method is equally applicable to the use of a stylus or other implement suitable for providing a touch input on a touch sensitive input region.

Whilst the invention has been described in terms of touch inputs, it will be appreciated that the invention is equally applicable to near touch inputs, in which a user brings a digit or stylus into sufficiently close proximity to the touch sensitive input region to enable the touch sensitive input region to establish an input location.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims

The invention claimed is:

1. On a computing system comprising a touch-sensitive input region and a display surface, a method of interaction by touch input, the method comprising the steps of:
   (a) displaying map data on the display surface;
   (b) detecting a first touch input at a first input location of the touch-sensitive input region;
   (c) defining a first display location on the display surface in accordance with the first input location;
   (d) detecting a second touch input at a second input location of the touch-sensitive input region;
   (e) defining a second display location on the display surface in accordance with the second input location;
   (f) defining a functional area in accordance with the first and the second display locations, the functional area encompassing a non-whole portion of the display surface and the second display location being located on a peripheral edge of the functional area;
   (g) graphically representing a plurality of functions on the peripheral edge of the functional area;
   (h) detecting a third touch input at a third input location of the touch-sensitive input region corresponding to one of the plurality of functions; and,
   (i) applying the function selected via the third touch input at step (h) to the functional area, wherein if the function selected at step (h) is associated with one or more additional functions, the method further comprises the steps of:
   (j) graphically representing the one or more additional functions on the peripheral edge of the functional area;
   (k) detecting an additional touch input at a location of the touch-sensitive input region corresponding to one of the one or more additional functions; and,
   (l) applying the function selected at step (k) to the functional area,
   wherein
      steps (j) to (l) are repeated if the function selected at step (k) is associated with a further one or more additional functions;
      the plurality of functions comprises location attribute data filtering functions;
      step (i) further comprises filtering location attribute data in accordance with the function selected at step (h) and the functional area to produce a filtered data set;
      the method comprises displaying the filtered data set on the display surface; and
      the filtered data set comprises discrete objects and the step of displaying the filtered data set comprises displaying graphical representations of the discrete objects at respective map locations associated with the discrete objects.

2. A method as claimed in claim 1, wherein the touch-sensitive input region and the display surface are integrated to define a touch-sensitive display surface.

3. A method as claimed in claim 2, wherein the first and/or the second display locations are coincident with the first and/or the second input locations respectively and wherein detecting the third touch input at the third input location of step (h) comprises detecting the third touch input at a location of a geographical representation of a function of the plurality of functions.

4. A method as claimed in claim 1, wherein detecting the first touch input of step (b) comprises detecting a tap gesture or a touch and hold gesture at the first input location.

5. A method as claimed in claim 1, wherein detecting the second touch input of step (d) comprises detecting a tap gesture or a touch and hold gesture at the second input location.

6. A method as claimed in claim 1, wherein detecting the third touch input of step (h) comprises detecting a dragging gesture along a portion of the peripheral edge of the functional area from the second input location to the third input location.

7. A method as claimed in claim 1, wherein defining the functional area of step (f) comprises defining a functional area such that the first display location is located within an interior of the functional area and the second display location is located on a peripheral edge of the functional area.

8. A method as claimed in claim 1, wherein graphically representing the plurality of functions of step (g) comprises displaying only the location attribute data filtering functions that upon completion of step (i), will produce for the selected functional area, a filtered data set having at least one entry.

9. A method as claimed in claim 1, wherein if the function selected at step (h) is associated with one or more additional location attribute data filtering functions executable on the filtered data set, the method further comprises the steps of:
(j) graphically representing the additional location attribute data filtering functions on the peripheral edge of the functional area;
(k) detecting an additional touch input at an input location of the touch-sensitive input region corresponding to one of the additional location attribute data filtering functions;
(l) filtering the filtered data set in accordance with the function selected at step (k) to produce a redefined filtered data set; and,
(m) displaying the redefined filtered data set on the display surface,
steps (j) to (m) being repeated if the function selected at step (k) is associated with the one or more additional location attribute data filtering functions executable on the re-defined filtered data set.

10. A method as claimed in claim 1, wherein the step of displaying the filtered data set comprises displaying a graph or a chart illustrative of all entries within the filtered data set.

11. A method as claimed in claim 1, further comprising the steps of:
detecting a fourth touch input, the fourth touch input comprising a dragging motion from a location on the peripheral edge of the functional area to a fourth location, the dragging motion being in a direction substantially perpendicular to the peripheral edge of the functional area; and,
redefining the functional area in accordance with the first and the fourth touch input locations, the first touch input location being located within an interior of the redefined functional area and the fourth touch input location being located on a peripheral edge of the redefined functional area.

12. A method as claimed in claim 1, wherein:
the method further comprises the steps of removing the filtering of step (i) and filtering the location attribute data in accordance with the function selected at step (h) and the redefined functional area to produce a redefined filtered data set.

13. A method as claimed in claim 1, further comprising the steps of:
detecting a fifth touch input, the fifth touch input comprising a dragging motion from an initial location within an interior of the functional area to a final location; and,
translating the functional area by a translation vector defined between the initial location and the final location.

14. A method as claimed in claim 13, wherein:
the method further comprises the steps of removing the filtering of step (i) and filtering the location attribute data in accordance with the function selected at step (h) and the translated functional area to produce a redefined filtered data set.

15. A method as claimed in claim 1, wherein the functional area is substantially circular, the first input location and/or the first display location being located at a centre of the substantially circular functional area and the plurality of location attribute data filtering functions being graphically represented circumferentially on the substantially circular functional area.

16. A computing system comprising:
a memory for storing map data, location attribute data and a plurality of functions, the location attribute data comprising metadata associating said location attribute data with the map data;
a touch-sensitive display surface configured to display the map data and/or the location attribute data and to detect a touch input generated by a user; and,
a processor configured to command the touch-sensitive display surface to display at least a portion of the map data; receive a first and a second touch input signals from the touch-sensitive display surface; define a first and a second display locations in accordance with the first and the second touch input signals; define a functional area in accordance with the first and the second display locations, the functional area encompassing a non-whole portion of the display surface and the second display location being located on a peripheral edge of the functional area; command the touch sensitive display surface to display graphical representations of a plurality of functions on a peripheral edge of the functional area; receive a third touch input signal from the touch-sensitive display surface at a location of the touch-sensitive display surface corresponding to one of the plurality of functions; and, apply the function to the functional area,
wherein when the selected function is associated with one or more additional functions, the processor is further configured to provide instructions to the display surface to graphically represent the additional functions on the peripheral edge of the functional area, detect an additional touch input at a location of the touch-sensitive input region corresponding to one of the additional functions; and the processor is further configured to apply the selected function to the functional area
wherein the plurality of functions comprise location attribute data filtering functions; location attribute data is filtered in accordance with the function selected when detecting a third touch input at a location of the touch-sensitive input region corresponding to one of the plurality of functions and the functional area to produce a filtered data set; the filtered data set is displayed on the display surface; the filtered data set comprises discrete objects; and the step of displaying the filtered data set comprises displaying graphical representations of the discrete objects at respective map locations associated with the discrete objects.

17. A computing system according to claim 16, wherein the touch-sensitive display surface is a multi-touch display surface configured to simultaneously detect touch input at one or more locations on said multi-touch display surface.

\* \* \* \* \*